E. S. GABRIEL.
CANDY CUTTING MACHINE.
APPLICATION FILED JULY 1, 1915.
1,288,868.
Patented Dec. 24, 1918.
5 SHEETS—SHEET 2.
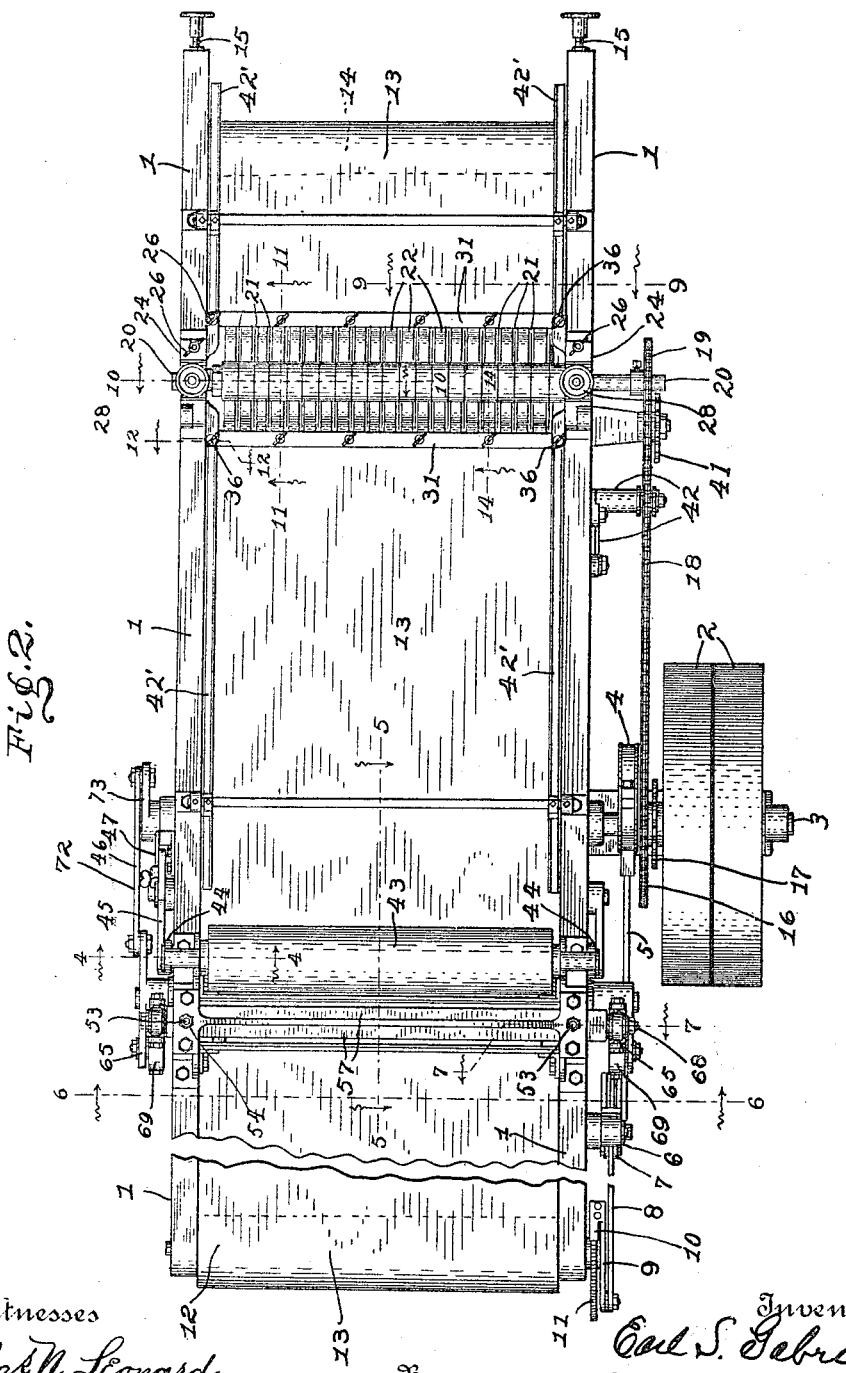

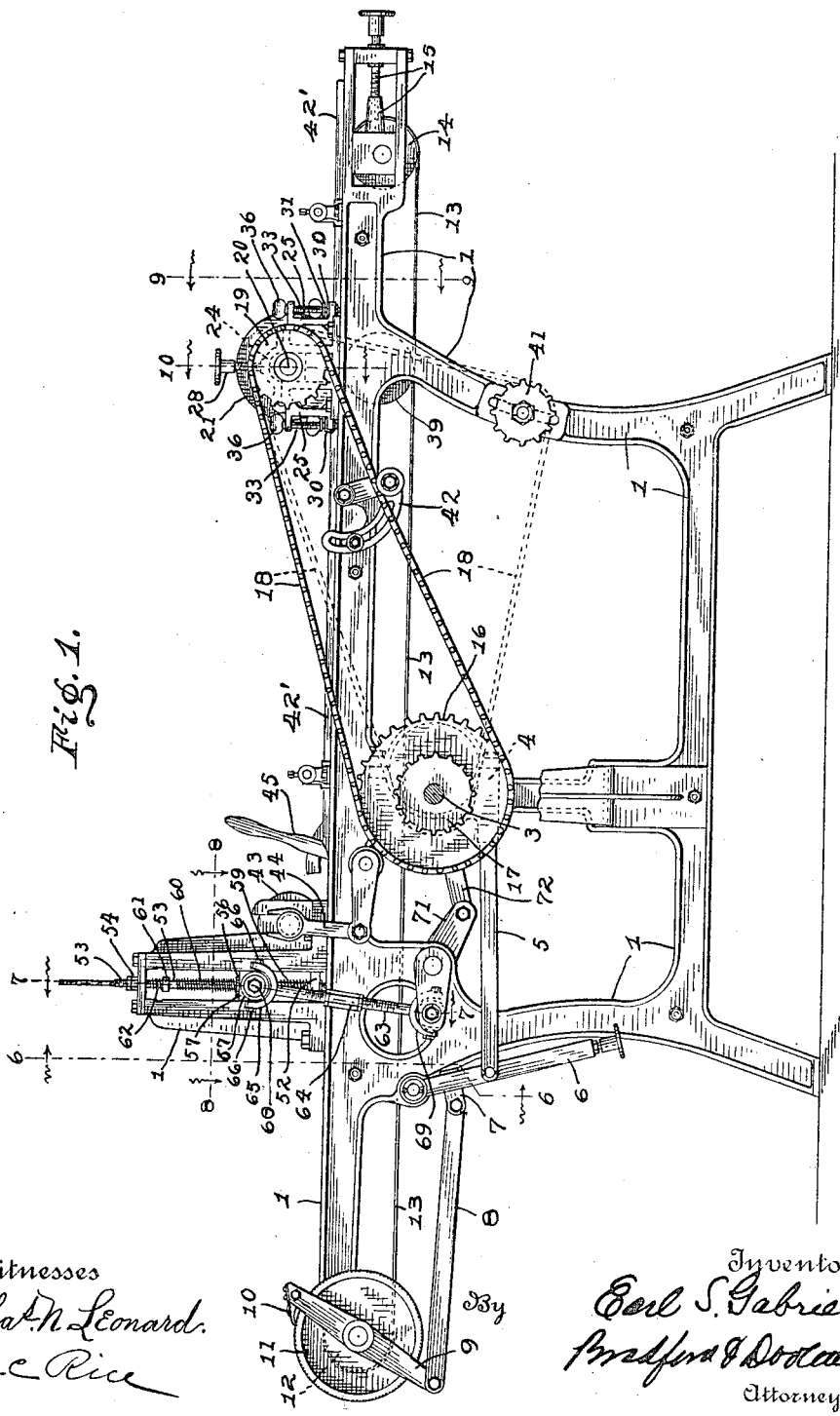

E. S. GABRIEL.
CANDY CUTTING MACHINE.
APPLICATION FILED JULY 1, 1915.
1,288,868.
Patented Dec. 24, 1918.
5 SHEETS—SHEET 3.
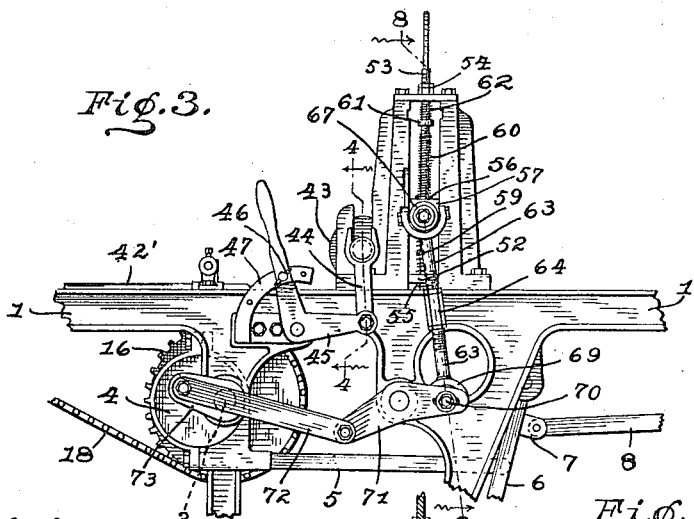
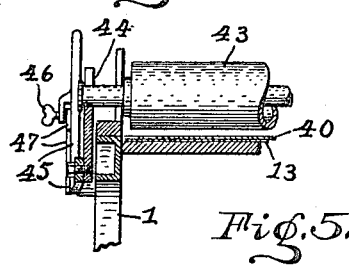
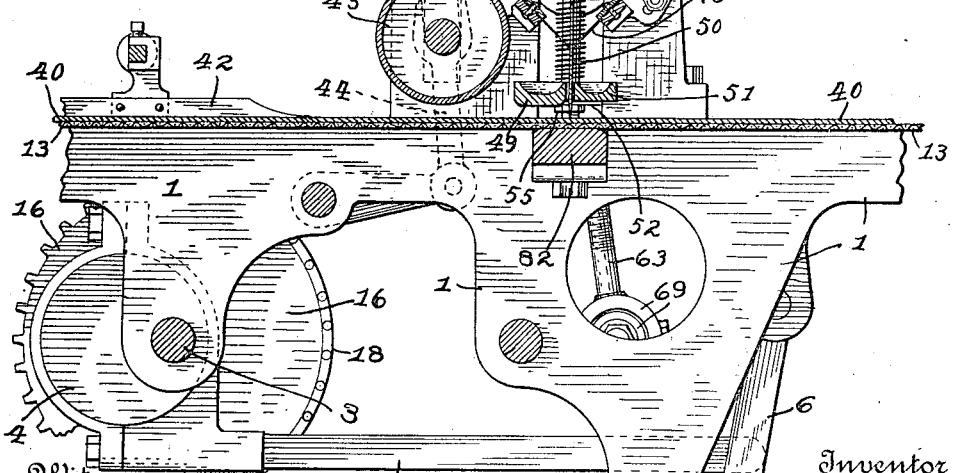
Witnesses
Chas. N. Leonard.
A. C. Rice
Inventor
Earl S. Gabriel
Bradford & Doolittle
Attorneys

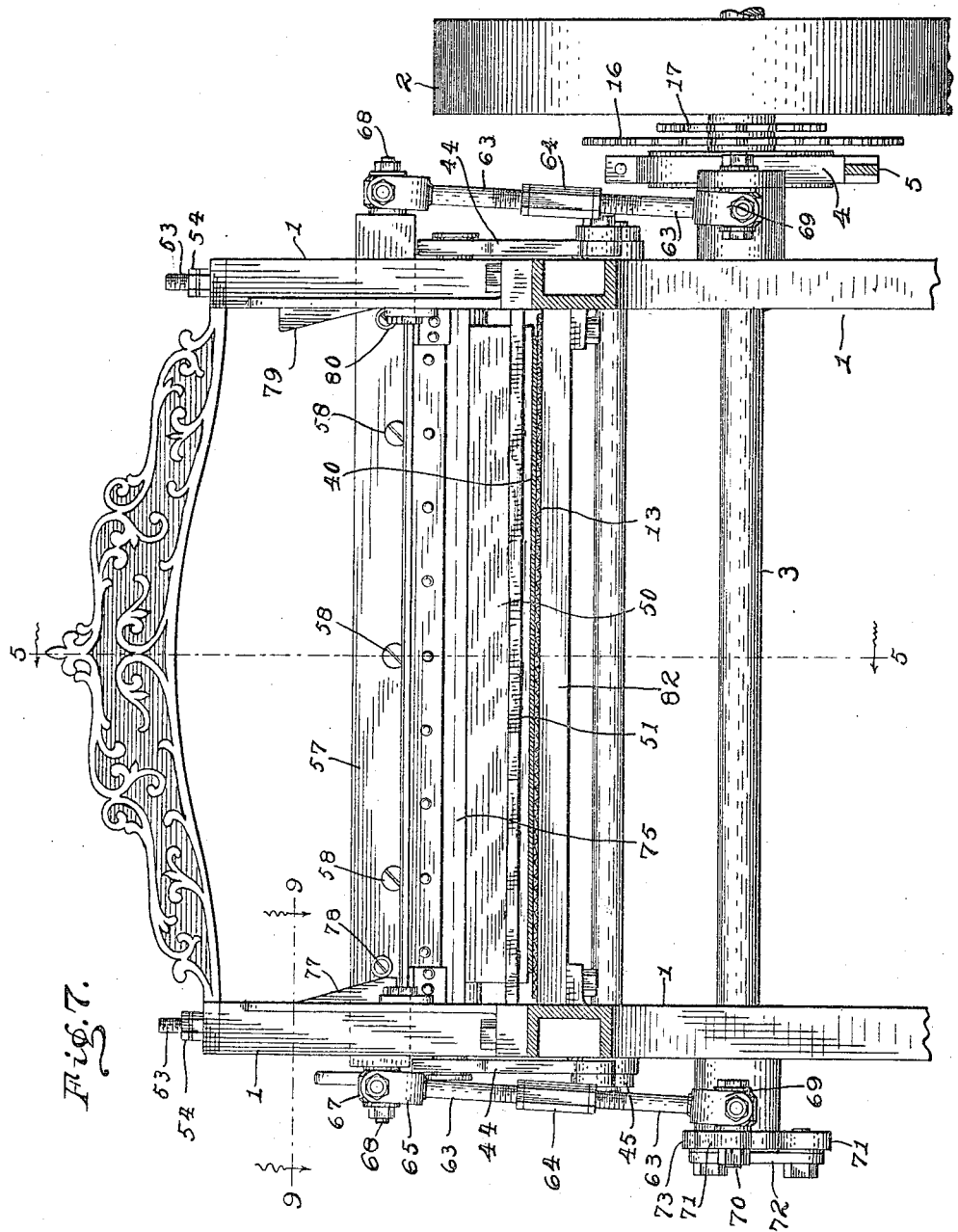

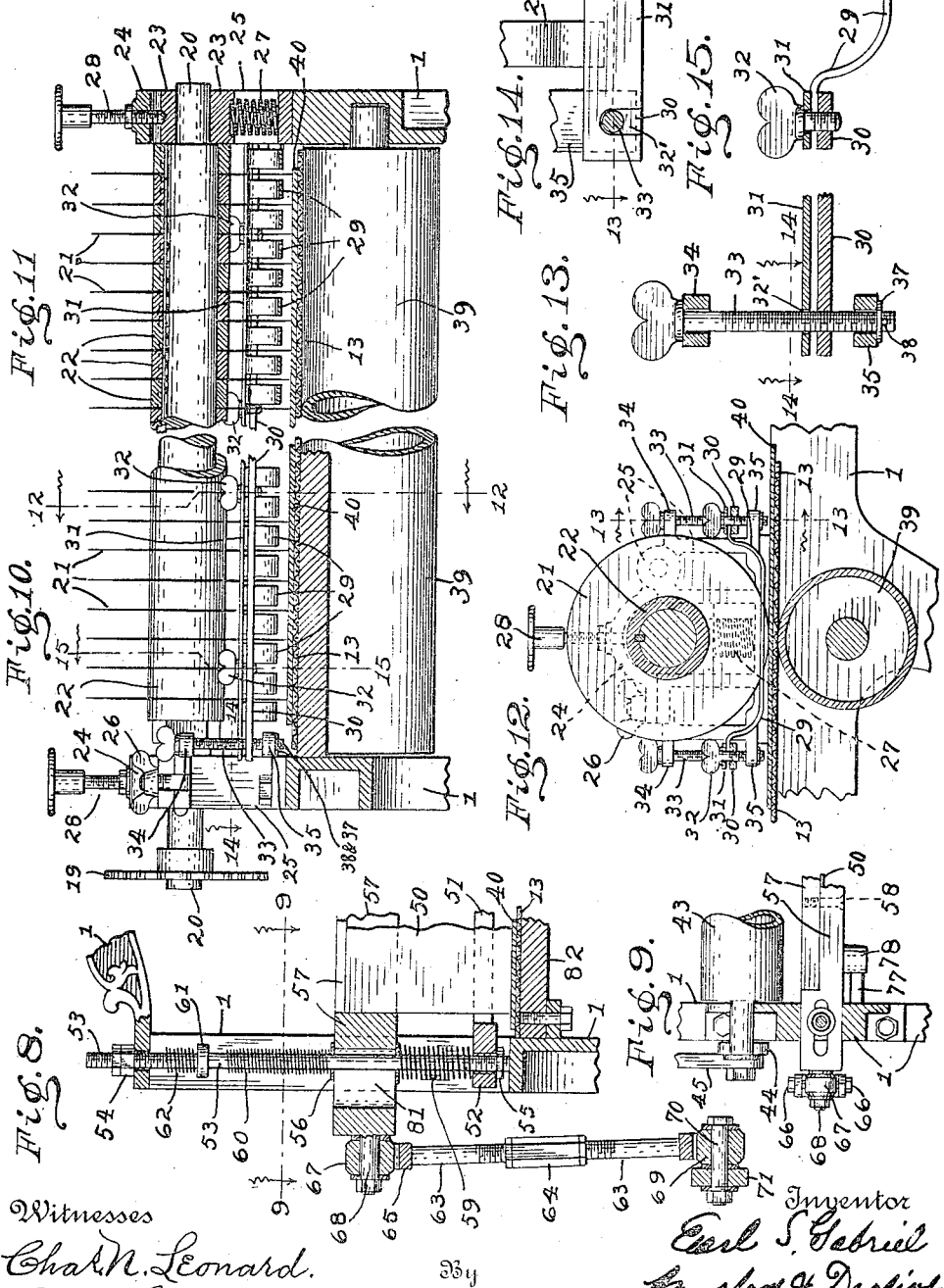

UNITED STATES PATENT OFFICE.

EARL S. GABRIEL, OF INDIANAPOLIS, INDIANA.

CANDY-CUTTING MACHINE.

1,288,868.  Specification of Letters Patent.  Patented Dec. 24, 1918.

Application filed July 1, 1915. Serial No. 37,503.

*To all whom it may concern:*

Be it known that I, EARL S. GABRIEL, a citizen of the United States, residing at Indianapolis, Marion county, and State of Indiana, have invented and discovered certain new and useful Improvements in Candy-Cutting Machines, of which the following is a specification.

My invention relates to candy cutting machines and its objects are to improve the cutting action of the transverse blade, to avoid displacement of the blocks of material during the cutting operation, to improve the scraper mechanisms employed in conjunction with the transverse and rotary cutters, to provide an effective driving mechanism for the transverse blade and to generally improve certain details of construction of a machine of this class.

To these ends my invention is embodied in preferable form in the machine hereinafter described and illustrated in the accompanying drawings.

In these drawings, Figure 1 is a side view in elevation of the machine; Fig. 2, a plan view; Fig. 3, a detail side view in elevation from opposite part of machine from that shown in Fig. 1; Fig. 4, a section on line 4—4 of Fig. 3; Fig. 5, a section on line 5—5 of Figs. 2 and 7; Fig. 6, a section on line 6—6 of Figs. 1 and 2; Fig. 7, a section on lines 7—7 of Figs. 1 and 2; Fig. 8, a section on line 8—8 of Fig. 1; Fig. 9, a section on line 9—9 of Fig. 8; Fig. 10, a section on line 10—10 of Figs. 1 and 2; Fig. 11, a section on line 11—11 of Fig. 2; Fig. 12, a section on line 12—12 of Fig. 10; Fig. 13, a section on line 13—13 of Figs. 12 and 14; Fig. 14, a section on line 14—14 of Fig. 13; and Fig. 15, a detail section of part of a scraper, taken on line 15—15 of Fig. 10.

Referring to the drawings, 1 is the frame of the machine, 2, the main driving wheel and 3, the main driving shaft.

On the shaft is mounted an eccentric 4, connected by a rod 5 with a rocking lever 6 to which is loosely connected an arm 7 pivotally connected to a link 8. This link is pivoted to the end of a rocking arm 9, which carries a ratchet 10 adapted to engage and intermittently operate a ratchet wheel 11 carried on the shaft of a roller 12. A conveying belt or apron 13, preferably of canvas is fed forward by the roller from right to left, viewing Fig. 1, in a step by step movement, the apron being stopped during the descent of the transverse cutter and moved forward after such operation. The rear end of the conveying apron passes over a roller 14 adjustable by means of a tightener device 15.

On the main shaft are mounted sprocket wheels 16 and 17 one larger than the other, with either of which, according to the speed to be imparted to the mechanism driven by the wheels, is engaged a chain 18 which drives a sprocket wheel 19 fixed on a shaft 20 extending across and above the apron on which shaft are mounted the rotary circular knives adapted to impart the longitudinal cuts to the sheet of candy as it is carried along.

These rotary disk-shaped knives 21, see Figs. 1, 2, 10, 11 and 12, are clamped on the shaft and spaced apart by removable spacing collars or washers 22 bearing against a shaft housing 23 at each end of the shaft 20, which housings are releasably locked in place on the frame by hinged plates 24, which are clamped to frame brackets 25 by winged nuts 26.

The housings are yieldingly mounted on cushioning springs 27, and set screws 28, passing through the plates 24 and into threaded sockets in the housings, serve to enable the shaft and knives to be adjusted up or down for the purpose of regulating the depth of cut of the rotary knives.

Adjacent to and between adjoining knives are mounted stripping and cleaning scrapers 29, consisting preferably of flat strips of metal upturned near their ends on opposite sides of the blades and terminating in flat, horizontal portions which rest upon horizontal bars 30 extending across the machine, one on each side of the line of knives, said scraper terminations being clamped upon said bars by upper removable bars 31 extending parallel thereto. Each of these upper bars is common to all the scraper ends on one side of the knives and they are clamped against the scrapers by set screws 32 passing freely through the upper bars and threaded into the lower bars and having wing heads on their upper ends. These scrapers serve to strip the material from the rotating knives. They are also adapted to serve as cleaners for the knives by being crowded against either knife of the adjacent pair by loosening the upper bar and individually shifting each scraper. The bars 31 are provided with slots 32', see Fig. 14, whereby they may be slid out horizontally away from the scrapers, to release the latter.

The lower bars 30 have threaded apertures to engage and be supported by screws 33, see Figs. 1, 10, 11, 12 and 13, which screws pass freely through apertures in the upper bars 31. These screws 33 also pass freely through apertures in upper and lower bracket arms 34 and 35 fixed to the frame and the upper ends of the screws are provided with winged nuts or heads 36 and the lower ends with washers 37, the latter limited by pins 38. By means of this construction the lower bars 30 and consequently the scrapers carried thereby may be tilted around the axis of the shaft carrying the knives for the purpose of altering the angle at which the scrapers are directed to the candy. For very sticky material it is preferable to have the ends of the scrapers on the far side, that is the left hand side as viewed in Fig. 1 raised somewhat higher than the ends of the scrapers on the other side of the center of the knives and this adjustment is effected by moving upward the screws 33 on the far side and turning downward the screws on the near side of said center so as to thereby tilt the far side of the scrapers upward slightly.

The knives may be removed from their shaft by loosening the clamp screws 26 and raising the hinged plates 24 and removing the housings 23 and then withdrawing the spacing collars 22 from the shaft. The scrapers may be readily removed for repair or replacement by loosening the clamping screws 32 so as to release the upper clamping bars 31 and sliding the latter away from the scrapers whereupon the scrapers may be slid along the lower bars 30 to the outer ends thereof.

A backing and feeding roller 39 is mounted in the frame of the machine below the circular rotary knives 21 and serves the purpose of supporting the candy against the pressure of the rotating knives as the candy is being cut thereby. As shown in Figs. 10 and 11, the strip or block of candy to be cut into small rectangular blocks is placed upon a piece of cardboard 40 which is carried along by the apron. As the candy is carried along by the apron it will pass under the rotating knives and be cut into longitudinal strips. The sprocket wheel of the shaft of these knives is ordinarily driven at twice the speed of the main shaft by connection with the sprocket wheel 16. If exceedingly soft and sticky material is being handled it is preferable to drive the knives at a slower speed which is effected by connecting the chain 18 with the sprocket wheel 17 on the main shaft. In this arrangement the chain is led over an idler wheel 41 mounted in the frame. A chain tightener 42 is mounted on the frame. As the strips of candy continue their movement they will be guided by the angle iron guide strips 42' extending along the sides of the frame and will then pass under an idler roll 43. The shaft of this idler roll is mounted in the upper ends of forked arms 44 located on opposite sides of the machine and the lower ends of which forked arms are pivoted to a bell crank lever 45 which is adapted to be adjustably clamped in different positions by a clamping screw 46 engaging apertures in a sector plate 47 mounted on the frame of the machine. By this arrangement the roll may be adjusted up or down to accommodate the same to different thicknesses of sheets of material. This roll serves to prevent material from kicking back as it is cut by the transverse knife.

In its continued forward movement the material will pass under a transverse gripper 49 extending across the machine in front of the transverse blade 50, see Fig. 5. On the far side of the blade 50 is a stripper 51. The gripper 49 with which the candy first comes into contact is adapted to press tightly against the surface of the material. The stripper on the far side, however, is about a quarter of an inch higher above the surface of the candy than the gripper in order that the blocks after being formed by the transverse knives may move forward freely. The upper surfaces of the gripper and stripper are trough-shaped to receive and collect the material scraped off from the blade. The gripper and stripper form part of a continuous transverse integral bar which is provided with heads 52 at the ends thereof. These heads have apertures through which freely pass vertically reciprocable rods 53 which rods are threaded near their upper ends to receive nuts 54 adapted to bear against the frame and are threaded at their lower ends to receive nuts 55. The rods also preferably carry two vertically spaced loose washers 56 between which extend transverse bars 57. These bars are adapted to clamp between them the transverse blade 50, such clamping action being effected by the screw 58, see Fig. 5. A cushioning spring 59 is mounted on each rod between the head 52 and the lower washer 56 or bars 57 and a spring 60 is mounted between the upper washer 56 and upper face of bar 57, and a collar 61 fixed on the rod. A buffer spring 62 is mounted between the collar 61 and the frame work.

The knife clamping bar is adapted to be vertically reciprocated by a pitman 63, see Fig. 3, which is divided into two parts connected by a turn buckle 64 for the purpose of permitting an adjustment of the pitman (see Figs. 8 and 9). The upper end of the pitman terminates in a yoke 65 which is pivoted on trunnion pins 66 extending from a ring 67 which loosely surrounds the end of a pin 68 extending from the knife clamping bar 57. This arrangement permits of a swinging movement of the pitman in a plane parallel to the length of the machine and also permits of a lateral movement in a plane transverse of the machine. The latter movement is provided for the purpose of permitting a shearing movement of the blade as the same moves up and down. The lower end of each pitman is connected by a similar pivotal arrangement 69, permitting of a movement of the pitman in two planes, to a transverse rod 70 to which is pivoted one end of a bell crank lever 71, pivoted on the frame and having the other end thereof pivoted to a link 72 which is in turn pivoted to a crank 73 carried by the main shaft (see Fig. 3). By this construction the transverse blade is adapted to be vertically reciprocated. As the bars 57 are carried upward by the pitman, the bars or the upper washer 56 on the rod 53 will be carried against the spring 60, raising the knife and carrying up said spring until the same strikes against the collar 61. This action will yieldingly pull upward the rod 53 which by the contact of the nut 55 against the lower face of the gripper bar will carry upward the grippers so as to release them from the candy. The spring 62 serves to cushion the upward movement of the rod and knife. In the downward movement of the knife bar the spring 59 will serve to cushion the movement of said bar, and also serve to press the grippers down tightly on the candy until the cut is made.

Mounted on each side of the transverse knife is a scraper 75 (see Figs. 5 and 6). Each scraper consists of a transverse strip of exceedingly thin stiff spring steel, not over one-sixty-fourth of an inch in thickness. By making them of this material and of extreme thinness, the scrapers possess sufficient stiffness to bear firmly against the sides of the blade and yet are sufficiently light and yielding to avoid any danger of bending the blade, which is an objectionable action frequently produced in machines of this class. This yielding property also enables the scrapers to readily yield as the knife enters between the scrapers and prevents dulling of the knife edge.

Each scraper is mounted in a bracket 76, which is slotted and provided with a clamping screw adjustable in the arc of a circle for the purpose of permitting the scraper to be adjusted with greater or less pressure against the sides of the blade, and to compensate for wear on the ends of the scrapers.

The transverse blade is adapted to have a shearing cut downward through the sheet of material and is adapted to be withdrawn upward through the material in a straight line, the latter movement serving to prevent displacement of the blocks of candy.

To the above end, the frame of the machine is provided on one side thereof with a downwardly enlarged cam 77 against which is adapted to travel a roller 78 mounted on one of the blade clamping bars (see Figs. 7, 8, 9). On the opposite side of the frame of the machine is fixed an upwardly enlarged cam 79 on which is adapted to ride a roller 80 carried by one of the bars which clamp the blade. The lower end of the cam 79 terminates short of the full line of travel of the roller 80. In the downward movement of the blade the same will be carried to the right, looking at Fig. 7 of the drawings, by the engagement of the roller 78 with the cam 77, thus imparting a shearing cut to the blade as the latter passes through the sheet of material. At its limit of downward travel, the roller 80 on the right hand side of the knife bar is below the lower end of the cam 79. When the blade is moved upwardly by the upward movement of the driving pitmen the roller 80 will move upward a short distance before it strikes against the face of the cam 79, thereby enabling the blade to move upward in a straight line sufficiently far to withdraw the blade from the blocks of candy. As soon as the roller 80 strikes against the cam 79 the blade in the continued upward movement thereof will be carried angularly to the left in a position to move downwardly when again actuated, with a shearing cut. The blade bar has laterally elongated slots 81 at the ends thereof to permit the angular downward and upward movements of the bar in effecting the shearing cut of the blade. A buffer bar 82 is located below the blade 50 to sustain the material against the cutting pressure of the blade.

The operation of the machine is as follows:

The sheet of candy or similar material is placed on the cardboard 40 and is carried along by the conveying apron under the rotary knives 21 by which the sheet is cut into longitudinal strips, while the scrapers 22 clear the blades and prevent the strips from being carried upwardly thereby. The rotary knives are continuously driven.

The material is then carried in a step-by-step movement by the traveling apron, operated by the ratchet 10, and passes under the idler roll 43. As it passes under the gripper member 49, the gripper bar descends and said member 49 bears tightly on the material. At the same time the transverse knife 50 is carried down by the pitman against the pressure of the lower springs 59 and cuts through the strips, forming the material into blocks. The stripper 51 prevents the material from being drawn upward by the knife, but since it is slightly spaced from the surface of the candy, permits the blocks to move forward freely during the next movement of the apron. The apron is stationary while the knife 50 is making its cut. As the knife is carried down, the roller 78 on the knife bar will move against the cam 79, carrying the blade laterally so as to effect an angular movement thereof to give its shearing cut. The gripper and stripper members move downward just ahead of the knife owing to the pressure of the released springs 59. After the transverse cut has been effected, the pitmen 63 will carry the blade upward. During its upward passage through the candy the blade will move in a straight line, thus preventing displacement of the blocks. As soon as the blade has cleared the material the roller 80 will engage the cam 79, and carry the blade over to its normal elevated position. At the same time the rod 53 will lift the gripper bar. As the blade is raised it will pass against the thin steel scrapers 75 and any material on the blade will be effectually scraped off into the troughs. These scrapers bear tightly against the blade but do not tend to bend the same owing to their thin light construction. As the blade moves up, the apron is again fed forward by its ratchet, carrying the blocks of candy toward the end of the machine.

What I claim is:

1. In a candy cutting machine, in combination with a series of rotary knives, fixed scraper members mounted between adjacent knives and each extending past the center of the knives, clamping bars extending transversely of the machine and between which said members are releasably clamped and means for locking said bars together, said scrapers being held in position solely by said bars.

2. In a candy cutting machine in combination with a series of rotary knives, a scraper and cleaner member between each two adjacent knives and having its opposite longitudinal side edges adapted to strip and clean said knives, each of said scrapers being separately adjustable against and away from either of said knives.

3. In a candy cutting machine, in combination with a series of rotary knives, a scraper member between each pair of adjacent knives and extending past the center of the knives, common releasable clamping means for the ends of all the members on each side of said knives, said members being separately adjustable.

4. In a candy cutting machine, in combination with a series of circular rotary knives, scraper members between adjacent knives extending past the center of the latter, a pair of upper and lower bars on each side of the knives extending transversely of the machine and between which the ends of the members are held and means to clamp the upper bar against the ends of said members, said clamping bars forming the sole means for holding the scraper members in place.

5. In a candy cutting machine, in combination with a conveying apron and a series of rotary knives, scraper members between adjacent knives, said members consisting of flat strips extending past the center of and to opposite sides of the knives and adjustable to alter the relative distances between the parts of the scrapers on opposite sides of the center and the apron, means to support said members at their ends and means to adjust said opposite supporting means angularly to the surface of the material to be cut, to effect the said adjustment of the scrapers.

6. In a candy cutting machine, in combination with a series of rotary knives, scraper members between adjacent knives, said members extending on both sides of the center of the knives, clamping bars to receive the ends of said members on each side of the knives and separate adjusting set screws on each of said sides operable to permit of the tilting of the scrapers to change the relative distance of their opposite ends from the surface of the candy.

7. In a candy cutting machine, in combination with a conveying apron, a series of rotary knives adapted to cut a sheet of candy into longitudinal strips, a transverse knife, an idle roller mounted for free rotation above the apron and immediately in front of said transverse knife in the line of travel of said apron and operable to prevent the material from being forced back by the knife, and means to adjust said roller up and down relatively to the apron.

8. In a candy cutting machine, in combination with a traveling conveying apron, a transverse knife, a transverse idler roll mounted for free rotation immediately in front of the knife in the line of travel of the apron and operable to prevent the material being forced back by the knife, adjustable arms supporting said roll and a lever for operating said arms to set said roll at different distances above the apron.

9. In a candy cutting machine, in combination with a conveying apron, rotary knives operable to cut the material into strips longitudinal of the apron, a transverse knife, gripper and stripper members mounted on opposite sides of the transverse knife and each extending parallel thereto across the machine and means to carry said members down on the candy during the cutting operation and to release them after such operation, said stripper being arranged above the gripper.

10. In a candy cutting machine, in combination with a conveying apron, a transverse knife, means to vertically reciprocate said knife, candy gripper and stripper members on opposite sides of said knife, said members being vertically movable coincidently with the knife, the gripper being on the near side of the knife and being adapted to bear tightly against the face of the sheet of material as it is carried under the knife and the stripper being on the far side and being spaced above the apron a greater distance than the gripper.

11. In a candy cutting machine, in combination with a conveying apron, a transverse knife, means to vertically reciprocate said knife, gripper and stripper members mounted on opposite sides of said knife and adapted to be carried downwardly during the descent of the knife to retain the material against upward withdrawal by the knife, scrapers, said gripper and stripper members having troughs to receive material scraped off the knife and forming part of an integral bar extending across the apron.

12. In a candy cutting machine, in combination with a conveying apron, a transverse knife, means to vertically reciprocate said knife, means to impart a shearing cut to said knife and means to withdraw said knife upward through the material in a straight line.

13. In a candy cutting machine, in combination with a conveying apron, a transverse knife, means to vertically reciprocate said knife, means for giving said knife an angular movement as it descends whereby a shearing cut will be given thereto, means for carrying said knife back in said angular movement as it ascends, said latter means being inoperative during the upward movement of the knife through the material.

14. In a candy cutting machine, in combination with a conveying apron, a transverse knife, means for vertically reciprocating said knife, a cam for imparting a shearing cut to said knife as it descends, a cam for returning said knife to normal position in the upward movement, said second cam being spaced at its lower end from the member that engages therewith, when said knife is down, whereby the knife will be caused to move upward through the material in a straight line.

15. In a candy cutting machine, in combination with a conveying apron, a transverse knife, a carrier for said knife, means to vertically reciprocate said knife carrier, a candy gripping member, a stripping member, vertical rods on which said carrier is movable vertically, springs interposed between said carrier and a part of said rods, and springs interposed between said gripper and stripper and said carrier, whereby the gripper and stripper will be yieldingly moved with the rods as the latter is reciprocated.

In witness whereof, I have hereunto set my hand and seal at Indianapolis, Indiana, this 18th day of June, A. D. nineteen hundred and fifteen.

EARL S. GABRIEL. [L. S.]

Witnesses:
A. C. RICE,
H. P. DOOLITTLE.

Copies of this patent may be obtained for five cents each, by addressing the "Commissioner of Patents, Washington, D. C."